(12) United States Patent
Kakamu et al.

(10) Patent No.: US 6,298,880 B1
(45) Date of Patent: Oct. 9, 2001

(54) SPOOL VALVE AND MANUFACTURING METHOD THEREFOR

(75) Inventors: Hideki Kakamu; Toshiya Mori, both of Aichi-ken (JP)

(73) Assignee: Aoyama Seisakusho Co., Ltd. (JP)

( * ) Notice: Subject to any disclaimer, the term of this patent is extended or adjusted under 35 U.S.C. 154(b) by 0 days.

(21) Appl. No.: 09/627,119

(22) Filed: Jul. 27, 2000

(30) Foreign Application Priority Data

Jul. 30, 1999 (JP) .................................................. 11-217000

(51) Int. Cl.⁷ ...................................................... F16K 11/06
(52) U.S. Cl. .................. 137/625.48; 29/890.124
(58) Field of Search ................... 137/625.48; 29/890.124

(56) References Cited

U.S. PATENT DOCUMENTS

| | | | |
|---|---|---|---|
| 4,169,578 | * 10/1979 | Adams | ................ 251/149.9 |
| 4,377,896 | * 3/1983 | Cox | ........................................ 29/437 |
| 5,172,727 | * 12/1992 | Stoll et al. | ....................... 137/625.66 |
| 5,421,367 | * 6/1995 | Murata | ............................ 137/625.69 |
| 5,988,591 | * 11/1999 | Akimoto et al. | ..................... 251/324 |
| 6,052,900 | * 4/2000 | Campbell | ......................... 29/890.13 |

* cited by examiner

Primary Examiner—John Fox
(74) Attorney, Agent, or Firm—David G. Conlin; Peter F. Corless; Edwards & Angell, LLP

(57) ABSTRACT

The invention relates to a spool valve having an inner hybrid construction and a method of manufacturing the same, and the spool valve comprising sliding surface portions and grooves, the sliding surface portions and the grooves being arranged alternately adjacent to each other in a longitudinal direction of the spool valve, the sliding surface portions being formed by sliding members, which are provided on a base portion of a synthetic resin to be fitted thereon.

14 Claims, 2 Drawing Sheets

SPOOL VALVE AND MANUFACTURING METHOD THEREFOR

BACKGROUND OF THE INVENTION

The invention relates to a spool valve, and more particularly, to a spool valve having an inner hybrid construction and a method of manufacturing the same.

Conventionally, a spool valve provided in a sleeve for switching has been brought into practical use as a directional control valve intended for switching a hydraulic circuit for startup, stoppage, acceleration or deceleration in a hydraulic actuator or the like.

FIGS. 4 and 5 show a typical configuration of such spool valve. In such spool valve, sliding surface portions 11, which form sealing portions between them and a sleeve inner surface (not shown), and ring-shaped grooves 12, which define between them and the sleeve inner surface a passage for a working fluid, are arranged alternately adjacent to each other in a longitudinal direction of the spool valve (see an upper halves of the figures). The sliding surface portions and the ring-shaped grooves are generally integrally formed of a metal, for example, carbon steel (steel type: S45C) or the like (see lower halves of the figures).

Spool valves having such configuration are completed by cutting predetermined lengths of a rod-shaped stock of a desired material, and subjecting the same to many working processes, such as carburization hardening, straightening, centerless, deburring or the like, after machining in accordance with a designed shape. With such conventional spool valves, machining are implemented by a NC machine programmed, which operation requires skill. Further, prior art involves much man-hour for processing of products, and such processes as carburization hardening, straightening or the like, which involve heat treatment take substantial time for treatment. Accordingly, such conventional spool valves are liable to become costly, which makes reduction in manufacturing cost difficult, and there is a limitation on improvement in productivity.

SUMMARY OF THE INVENTION

The invention has been accomplished in order to solve the above-mentioned problems of prior art, and provides a spool valve, which achieves reduction in processing man-hour for manufacture as well as shortening of processing time and does not require skilled work while enabling reduction in manufacturing cost, and a method of manufacturing the same.

The above-mentioned problems can be solved by the invention that has a feature in a spool valve comprising sliding surface portions, which define sealing portions between them and an inner surface of a sleeve, and grooves, which define passages for a working fluid between them and the inner surface of the sleeve, the sliding surface portions and the grooves being arranged alternately adjacent to each other in a longitudinal direction of the spool valve, the sliding surface portions being formed by sliding members, which are provided on a base portion of a synthetic resin to be fitted thereon.

The spool valve of the invention can be preferably embodied by (1) an embodiment, in which base portions comprise a plurality of synthetic resin moldings formed on a periphery of a core material, and sliding members are mounted on peripheries of the respective base portions in fitted state, (2) an embodiment, in which a base portion comprises a synthetic resin molding formed to cover an entire outer periphery of the core material, and a plurality of sliding members are mounted to the base portion at predetermined locations in fitted state, (3) an embodiment, in which a base portion comprises a synthetic resin molding formed integrally to comprise a core material of the spool valve, and a plurality of sliding members are mounted to the base portion at predetermined locations in fitted state, and (4) an embodiment, in which the synthetic resin molding or moldings comprise a synthetic resin molding or moldings, to which an orientation property is given.

According to the invention, a desired spool valve can be manufactured by previously manufacturing sliding members, which are composed of, for example, ring-shaped metallic bodies and which are relatively easy to manufacture and simple in configuration, forming a base portion of a synthetic resin by means of the so-called insert molding, in which the sliding members are set in a cavity of a mold having a predetermined configuration and a predetermined synthetic resin is injected to perform molding integrally with the ring-shaped metallic bodies, and simultaneously making the sliding members integral with the base portion in fitting state. In this manner, the manufacturing method of the invention enables manufacturing a spool valve with less man-hour and short time in processing and without high skill.

BRIEF DESCRIPTION OF THE INVENTION

DESCRIPTION OF THE PREFERRED EMBODIMENTS

Figure 1:
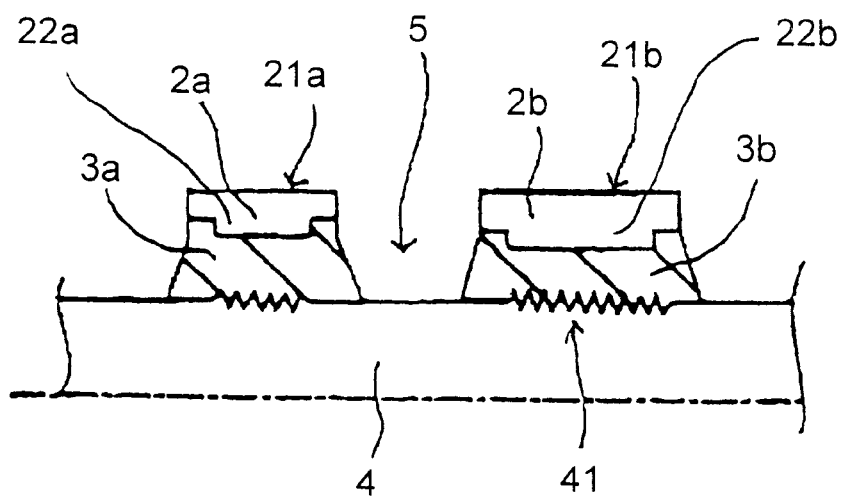
FIG. 1 is a partial, cross sectional view showing an embodiment of a spool valve of the invention.

Embodiments of a spool valve of the invention will be described below with reference to the drawings.

The spool valve of the invention comprises, as a fundamental constructional unit, sliding members 2a, 2b and a groove 5, which are arranged alternately adjacent to one another on a periphery of a core material 4. Here, sliding surface portions 21a, 21b existed on outer peripheries of the sliding members are kept in contact condition with an inner surface of a sleeve (not shown) at all times to define sealing portions for sealing flow of a working fluid, and the groove 5 defines a passage for the working fluid. While only two sliding members and one groove are shown in the figures, this is for the purpose of avoiding complexity of explanation, and the number of these members or elements are actually optional (the same applies to the following descriptions).

The spool valve (see FIG. 1) according to a first embodiment of the invention has a feature in that the sliding surface portions 21a, 21b are defined by outer surfaces of the sliding members 2a, 2b mounted and fitted onto peripheries of base members 3a, 3b of a synthetic resin.

Here, the base members 3a, 3b of a synthetic resin are in the form of a plurality of ring-shaped synthetic resin moldings to be fixedly mounted to a surface of the core material 4. Thus the groove 5 defining a passage for the working fluid is defined by respective side surfaces of the sliding members 2a, 2b and the base members 3a, 3b, an exposed surface of the core material 4, and an inner surface of the sleeve.

In addition, a simplest configuration of the core material 4 is rod-shaped, but a cross section of the core material is not limited to circular, and may be varied such as elliptical, polygonal, star shaped. Meanwhile, metals such as carbon steel, light alloys or the like may be employed as a material for the core material in accordance with applications.

Also, a synthetic resin suited for formation of the base members 3a, 3b can be selected from thermoplastic or thermosetting resins, for example, phenol resin (PF), polyphenylene sulfide (PPS), polyamide resin (PA), polypropylene resin (PP) or the like. In the invention, a synthetic resin includes, in addition to a combination of a plurality of synthetic resins, a combination of a synthetic resin or resins with a reinforcement material, such as glass fiber, filler, and a component, such as additive agents, intended for functional regulation and reforming.

Further, because the sliding members 2a, 2b are mounted on the base members 3a, 3b in fitted state, they are naturally annular in shape, but are not limited to torus and may employ such configuration as polygonal, for example, quadrilateral, hexagonal, elliptical, star shaped, umeblossom-shaped. Also, it is preferable to provide embedded portions 22a, 22b on cross sectional shape of the sliding members, in particular, those portions thereof, which are mounted onto the base members 3a, 3b in fitted state, to enhance strength in fitting. Here, applicable as a material suited for the sliding members are metals such as stainless steel, aluminum or the like in addition to conventional carbon steel, or various synthetic resins, for example, polyacetal, polyamide, having excellent wear and abrasion resistance.

To manufacture a hybrid type spool valve of the above-mentioned configuration, it suffices to set the sliding members 2a, 2b and the core material 4 as inserts in a cavity of an injection molding die, and then to inject a synthetic resin into spaces corresponding to the base members 3a, 3b to solidify the same. In this manner, insert molding is used to enable manufacturing a spool valve having an excellent dimensional accuracy with good reproducibility and with less man-hour because a shape of a finished spool valve is determined by inserts such as the sliding members 2a, 2b inserted beforehand in predetermined positions of a mold die (insert molding is also applicable to embodiments described later). In this case, surfaces of the core material 4 are processed to be made irregular as illustrated in FIG. 1, and then the base members 3a, 3b are fixed to the surfaces, whereby the fixing strength can be favorably enhanced (the same is with the second embodiment).

According to a second embodiment (see FIG. 2), in place of the base members 3a, 3b described above, a synthetic resin molding 6 is formed to cover the entire peripheral surface of the core material 4 made of, for example, a metallic round bar, and a plurality of sliding members 2a, 2b are mounted around the synthetic resin molding at predetermined positions to be fitted thereon. In this embodiment, since the base members 3a, 3b in the embodiment shown in FIG. 1 are replaced with the synthetic resin molding 6, which is formed integrally to cover the entire peripheral surface of the core material 4, there is presented, in addition to the above-mentioned advantage, an advantage that in the case where the sliding members 2a, 2b are to be subjected to insert molding, the entire elements can be simultaneously molded and fixed by injecting a synthetic resin from one end of the core material in a longitudinal direction.

Figure 3:
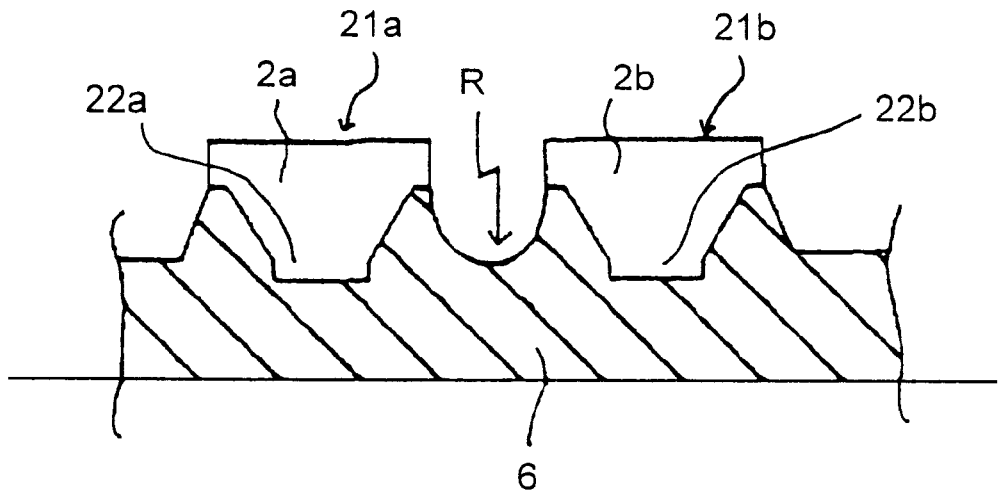
FIG. 3 is a partial, cross sectional view showing a still further embodiment of a spool valve of the invention.
Figure 4:
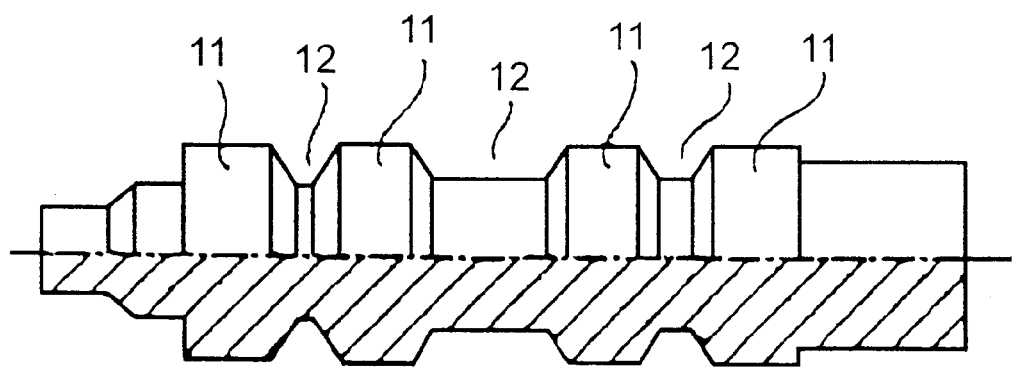
FIGS. 4 and 5 are side views (upper halves)/cross sectional views (lower halves) of prior spool valve.
Figure 5:
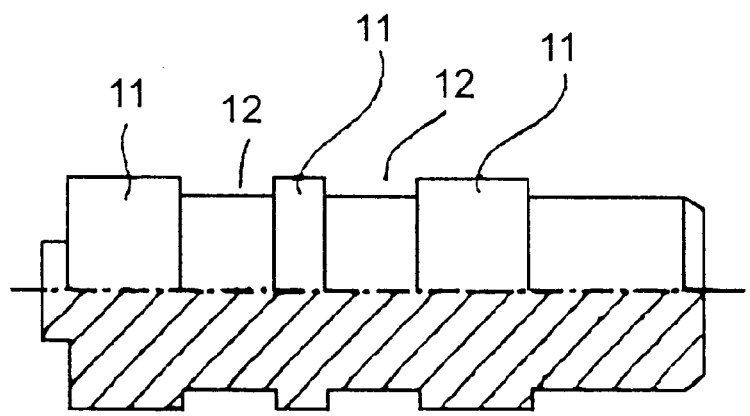

According to a third embodiment shown in FIG. 3, the core material 4 used in the two embodiments described above is omitted, and the base members 3a, 3b and a portion defining a core material of a spool valve are replaced with a synthetic resin molding 6, which is integrally molded. The sliding members 2a, 2b are mounted on the synthetic resin molding at predetermined locations thereof to be fitted thereon. This embodiment has an advantage that it is unnecessary to separately prepare the core material 4. In addition, spool valves are used in high pressure condition, and inherently operate as a whole under a balanced pressure, so that there is caused no obstacle even when a synthetic resin having less rigidity than that of a metal (the first and second embodiments) is generally used for the core material 4.

Also, in the second and third embodiments, when an orientation property is given to molecular configuration of resin polymer, which constitutes a portion of the synthetic resin molding 6, a coefficient of thermal expansion can be set to be small in a direction in parallel to a direction, along which the orientation property is given, and a coefficient of thermal expansion can be set to be large in a direction perpendicular to the direction, along which the orientation property is given. For example, when injection molding is carried out from one end of a spool valve along an axial direction of the spool valve, it is possible to give an orientation property to the synthetic resin molding 6 such that the used synthetic resin, for example, polyphenylene sulfide (PPS), and glass fiber added thereto are aligned in the axial direction of the spool valve. When injection molding is carried out in such manner, a coefficient of thermal expansion can be set to be small in the axial direction of the spool valve, so that there is obtained an advantage that the spool valve can be enhanced in control accuracy even in circumstances, in which the spool valve is used in greatly varying temperature.

Figure 2:
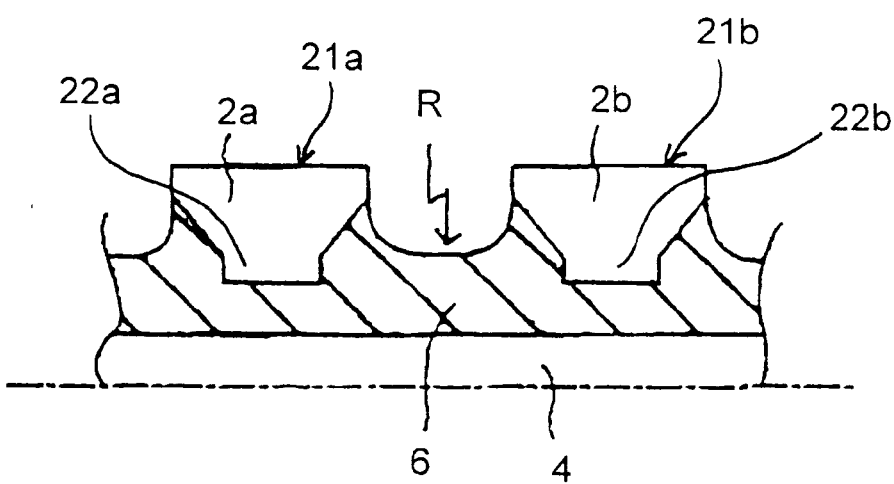
FIG. 2 is a partial, cross sectional view showing another embodiment of a spool valve of the invention.

Further, a bottom portions of the groove 5 formed between the sliding members 2a, 2b on the synthetic resin molding 6 is shaped to have a predetermined curvature R as shown in FIGS. 2 and 3, whereby the portion can be suppressed in expansion and contraction. In this case, in the portion having the curvature R, synthetic resins and glass fiber tend to be arranged in directions perpendicular to a surface of the portion having the curvature R, with the result that there is obtained a favorable effect that the entire spool valve becomes less in thermal expansion and contraction in a radial direction.

The spool valve of the invention is constructed in a manner described above, and so man-hour for manufacture can be reduced and time for processing can be shortened. Also, it is possible to manufacture spool valves having high accuracy without any skilled work and to reduce manufacturing cost. Also, there is produced an excellent effect that it is possible to regulate operating and sealing performances of a spool valve by controlling the characteristics of thermal expansion in axial and diametrical directions. Accordingly, the hybrid type spool valve of the invention dissolves the problems of prior art to be exceedingly great in industrial evaluation.

What is claimed is:

1. A spool valve comprising sliding surface portions, which define sealing portions between them and an inner surface of a sleeve, and grooves, which define passages for a working fluid between them and the inner surface of the sleeve, the sliding surface portions and the grooves being arranged alternately adjacent to each other in a longitudinal direction of the spool valve, the sliding surface portions being formed by sliding members, which are provided on a base portion of a synthetic resin to be fitted thereon.

2. The spool valve according to claim 1, wherein the base portion comprises a plurality of synthetic resin moldings formed on a periphery of a core material at a predetermined interval.

3. The spool valve according to claim 1, wherein the base portion comprises a synthetic resin molding formed to cover an entire outer periphery of a core material.

4. The spool valve according to claim 1, wherein the base portion comprises a synthetic resin molding formed integrally to comprise a core material of the spool valve.

5. The spool valve according to claim 3, wherein the synthetic resin molding or moldings comprise a synthetic resin molding or moldings, to which an orientation property is given.

6. The spool valve according to claim 4, wherein the synthetic resin molding or moldings comprise a synthetic resin molding or moldings, to which an orientation property is given.

7. The spool valve according to claim 2, wherein a surface of the core material, which is mounted to the base portion, comprises an irregular surface.

8. The spool valve according to claim 3, wherein a surface of the core material, which is mounted to the base portion, comprises an irregular surface.

9. The spool valve according to claim 2, wherein surfaces of the sliding surface portions, which are mounted to the synthetic resin molding or moldings, comprise embedded portions.

10. The spool valve according to claim 3, wherein surfaces of the sliding surface portions, which are mounted to the synthetic resin molding or moldings, comprise embedded portions.

11. The spool valve according to claim 4, wherein surfaces of the sliding surface portions, which are mounted to the synthetic resin molding or moldings, comprise embedded portions.

12. The spool valve according to claim 3, wherein bottoms of the grooves are shaped to have a curvature R.

13. The spool valve according to claim 4, wherein bottoms of the grooves are shaped to have a curvature R.

14. A method of manufacturing a spool valve according to any one of claims 1 to 13 by insert molding, in which sliding members and a core material, or sliding members having predetermined shapes serve as insert.

* * * * *